US008810780B1

(12) United States Patent
Barcelo et al.

(10) Patent No.: US 8,810,780 B1
(45) Date of Patent: Aug. 19, 2014

(54) PLASMON RESONANCE BASED STRAIN GAUGE

(71) Applicant: Hewlett-Packard Development Company, L.P., Houston, TX (US)

(72) Inventors: Steven J Barcelo, Palo Alto, CA (US); Zhiyong Li, Redwood City, CA (US); Gary Gibson, Palo Alto, CA (US); Mineo Yamakawa, Campbell, CA (US); Ansoon Kim, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/755,801

(22) Filed: Jan. 31, 2013

(51) Int. Cl.
*G01B 11/16* (2006.01)
*G01L 1/24* (2006.01)

(52) U.S. Cl.
CPC . *G01L 1/24* (2013.01); *G01B 11/16* (2013.01); *G01L 1/241* (2013.01)
USPC ............................................ 356/33; 356/32

(58) Field of Classification Search
CPC ............... A61B 2562/0261; A61B 2562/0266; A61B 2019/464; G01B 11/18; G01B 21/18; G01B 7/26; G01L 1/22; G01L 1/2287; G01L 23/04; G01L 5/00; G01N 17/00; G01N 3/00
USPC ................................................... 356/32–35
See application file for complete search history.

(56) References Cited

U.S. PATENT DOCUMENTS

| 5,488,230 | A | * | 1/1996 | Mizutani et al. | 250/548 |
| 5,678,319 | A | * | 10/1997 | Huber | 33/707 |
| 7,553,681 | B2 | | 6/2009 | Raravikar et al. | |
| 2004/0263860 | A1 | * | 12/2004 | Johnson | 356/499 |
| 2010/0098579 | A1 | * | 4/2010 | Xu et al. | 420/471 |
| 2011/0069316 | A1 | | 3/2011 | Chau et al. | |
| 2011/0098579 | A1 | * | 4/2011 | Ajiki et al. | 600/485 |
| 2011/0116094 | A1 | * | 5/2011 | Allsop et al. | 356/445 |
| 2012/0032286 | A1 | | 2/2012 | Trusov et al. | |
| 2012/0156099 | A1 | | 6/2012 | Zhong et al. | |

OTHER PUBLICATIONS

Barcelo et al., "Fabrication of Deterministic Nanostructure Assemblies with Sub-nanometer Spacing Using a Nanoimprinting Transfer Technique," ACSNano vol. 6 ' No. 7, pp. 6446-6452 (Jun. 26, 2012).
Farcau, Cosmin, et al. "Monolayered wires of gold colloidal nanoparticles for high-sensitivity strain sensing." The Journal of Physical Chemistry C 115.30 (2011):14494-14499.
Sannomiya et al., "Imaging, Spectroscopy and Sensing . . . ," in "Optical Imaging: Technology, Methods and Applications," Akira Tanaka and Botan Nakamura, Aug. 2012.
Tanner, J. L., et al. "High strain sensitivity controlled by the surface density of platinum nanoparticles." Nanotechnology 23,28 (2012): 285501.
Zhao, Linlin et al., "The Extinction Spectra of Silver Nanoparticle Arrays: Influence of Array Structure on . . . ," J. Phys. Chem. B 2003, vol. 107, pp. 7343-7350.

* cited by examiner

Primary Examiner — Michael P Stafira (57) ABSTRACT

A strain gauge or other device may include a deformable medium and discrete plasmon supporting structures arranged to create one or more plasmon resonances that change with deformation of the medium and provide the device with an optical characteristic that indicates the deformation of the medium.

18 Claims, 6 Drawing Sheets

PLASMON RESONANCE BASED STRAIN GAUGE

BACKGROUND

A strain gauge can measure the strain or deformation of an object. Typical strain gauges are based on the change in resistance of a metal undergoing strain. For example, one type of strain gauge includes a metallic foil pattern that may be attached to an object, so that deformation of the object deforms and changes the electrical resistance of the foil. A measurement of the change in the electrical resistance can thus provide a measure of the strain or deformation of the object. Strain gauges can measure other physical quantities such as force, acceleration, pressure, torque, or even temperature by placing the strain gauge on an object that has known deformations in response to the physical quantity being measured. In particular, a measurement of the strain may indicate an ambient or applied physical quantity.

BRIEF DESCRIPTION OF THE DRAWINGS

The drawings illustrate examples for the purpose of explanation and are not of the invention itself. Use of the same reference symbols in different figures indicates similar or identical items.

DETAILED DESCRIPTION

A strain gauge can employ a deterministic arrangement or array of discrete plasmon supporting structures such as plasmonic nanoparticles. The deterministic arrangement of the plasmon supporting structures can create relationships between deformation of the object and resulting changes in optical characteristics such as the number, frequencies, widths, and relative magnitudes associated with plasmon resonances in the strain gauge. For example, one or more frequencies, widths, or relative magnitudes of plasmon resonances may change in response to changes in separations of the plasmon supporting structures that the deformation of an object or a medium may cause. Similarly, one or more plasmon resonances may appear or disappear in response to changes in separations of the plasmon supporting structures. Optical measurement of light interactions with the plasmon resonances in a strain gauge can measure changes such as changes in the frequencies of the plasmon resonances, and the measured changes can then be converted into a quantitative measurement of strain, torsion, or other physical quantity that may depend on the strain or torsion of an array. Alternatively, a strain gauge including an array of discrete plasmon supporting structures may exhibit color changes in visible wavelengths that can be detected with the human eye or with a relatively simple interface.

The arrays within a strain gauge may be hierarchical, for example, by arraying assemblies of plasmon supporting structures. A lowest level assembly may include an array of discrete plasmon supporting structures with separations arranged so that plasmon resonances that the structures collectively support within an assembly have frequencies that depend on the separations of the particles within the assembly. The separations of assemblies from other assemblies may be larger and create other plasmon resonances that are collectively supported in multiple assemblies. The plasmon resonances associated with longer separations often have lower frequencies than plasmon resonances associated with shorter separations. However, changing the separation between plasmonic structures can result in hybrid resonances that are not apparent in structures with other separations, so that optical characteristics resulting from different separations are not always simply a shifting of the same resonances. Still, an array with multiple hierarchical levels can thus create plasmon resonances with frequencies at multiple scales respectively associated with the multiple hierarchical levels. A strain sensor with such assemblies may thus display plasmon resonances with a wide dynamic range of plasmon frequencies.

Arrays of discrete plasmon supporting structures can be created with a wide variety of specific geometries or patterns to create sensors with different sensitivities to strain and different color or spectral responses to strain. In particular, arrays or assemblies may have multiple symmetry axes, and a single sensor can measure multiple dimensions or components of a physical quantity such as strain or torsion, where the measured components are related to the symmetry axes. These strain gauges can also be configured to yield measurements of many physical quantities including but not limited to pressure, force, acceleration, torque, and any other physical quantities that may be related to the measured strain, torsion, or other deformation of the sensor.

Figure 1A:
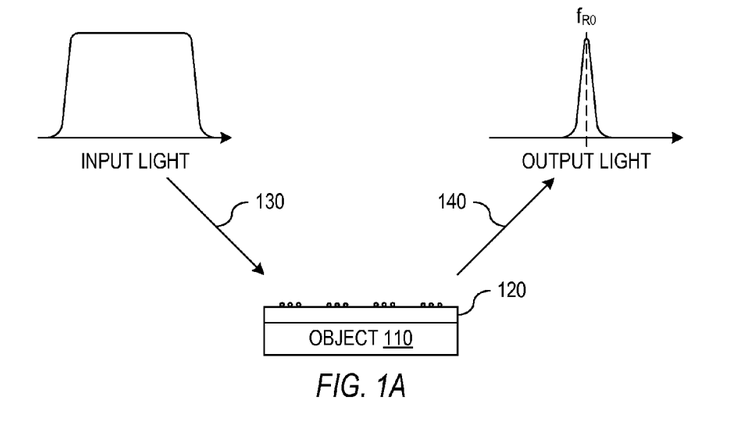
FIGS. 1A and 1B illustrate general principles of one implementation of a strain measurement.
Figure 1B:
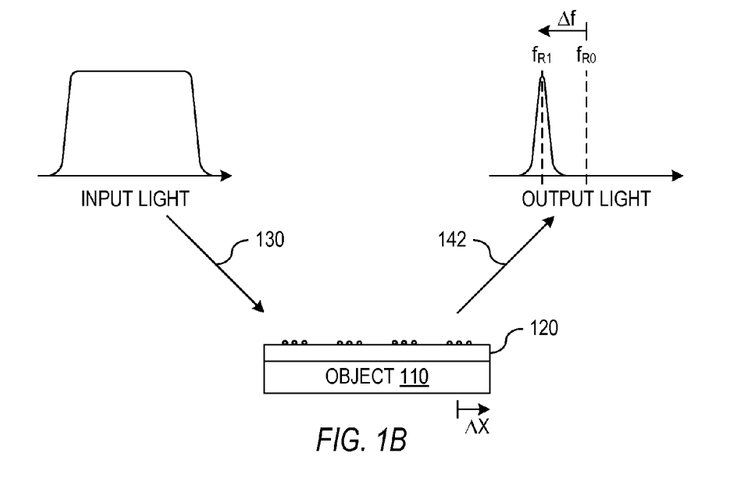

FIGS. 1A and 1B illustrate general principles of one implementation of a strain measurement. As shown in FIG. 1A, an object 110 may have a surface with an attached deterministic array 120 of discrete plasmon supporting structures that collectively have one or more plasmon resonance. FIG. 1A is intended to illustrate an example where array 120 has a single plasmon resonance with a frequency $f_{R0}$ when array 120 has no deformation. Input light 130 that is incident on array 120 can have any desired spectral content or polarization characteristics, but as one example, input light 130 may be unpolarized light and include electromagnetic radiation with a range of wavelengths, e.g., white light. Input light 130 can interact with array 120 or object 110, so that output light 140, which may be reflected, scattered, diffracted, or otherwise radiated from object 110, may have a spectral content, an angular distribution, or polarization characteristics that differ from input light 130 in a manner that depends on the deformation of array 120. For example, if object 110 or a medium of array 120 is a strong absorber of the wavelengths in input light 130, array 120 may absorb or scatter most of input light 130. FIG. 1A shows an example in which most frequencies of input light 130 may be strongly absorbed, but a plasmon resonance of array 120 makes object 110 highly efficient at scattering light having frequency $f_{R0}$. Alternatively, a resonance of array 120 may primarily absorb light with frequency $f_{R0}$, and object 110 reflects the remainder of input light 130 so that output light 140 is similar to input light 130 but has a 'spectral hole' at resonance frequency $f_{R0}$. In both examples, input light 130, which in different implementations may have many different spectral distributions, can consistently produce output light 140 having spectral distribution with a prominent feature at frequency $f_{R0}$. This spectral feature depends on the pattern of array 120 and may give object 110 a color characteristic of frequency $f_{R0}$ if frequency $f_{R0}$ corresponds to a visible frequency of light.

FIG. 1B illustrates an effect that may result from strain on object 110. For example, strain may change the shape, e.g., stretch or compress one or more dimensions, of object 110, and the separations of the discrete plasmon supporting structures in array 120 may correspondingly change. Such changes are known to change the collective plasmon resonance frequencies, and FIG. 1B illustrates an example where stretching of object 110 and array 120 shifts the plasmon resonance from the unstressed frequency $f_{R0}$ to a frequency $f_{R1}$. As a result, even with the same input light 130 as used in the example of FIG. 1A, output light 142 when object 110 is under strain has a different spectral content, even a different color if frequency $f_{R0}$ or $f_{R1}$ is in the visible range. As shown in FIG. 1B, a feature in the spectral distribution of output light 140 may have a frequency shift Δf corresponding to the difference between plasmon resonance frequencies $f_{R0}$ and $f_{R1}$. Frequency shift Δf is related to a strain ΔX in object 110. As a result, strain ΔX in object 110 can be observed or measured by observing or measuring the spectral content of output light 140 and 142.

The differences in output light 140 and 142 of FIGS. 1A and 1B illustrate relatively simple techniques for observing deformation of object 110 by observing optical response of array 120 and particularly by observing a frequency shift in a spectral feature corresponding to a plasmon resonance. Observing the optical response of an array of plasmons supporting structures in some other implementations may include observing other optical effects caused by plasmon resonances. For example, deformations can be detected by observing frequency shifts in features (e.g., peaks or holes) of the output light, observing changes in the relative amplitude of features in the output light, observing changes in the widths of one or more features in the output light, or observing the emergence or disappearance of a spectral peak or hole in the output light, or observing any combination of these.

Figure 2A:
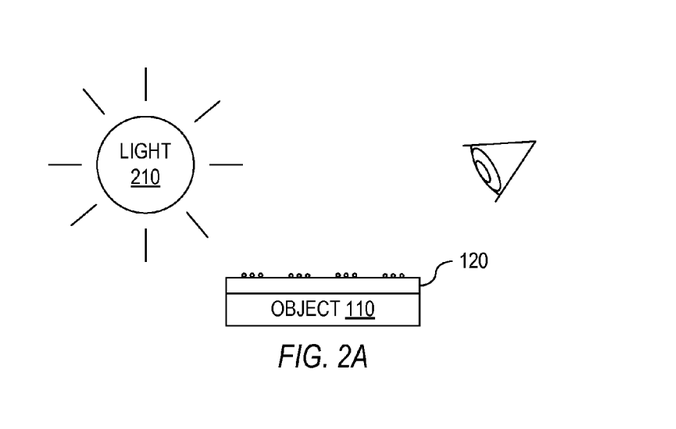
FIGS. 2A and 2B illustrate alternative implementations of measurement systems.

FIG. 2A illustrates how strain in object 110 can be simply observed using the naked eye in any available lighting 210. For example, object 110 may be a mechanical member such as a beam, joint, or cantilever in a structure such as a bridge, building, or other edifice that is coated with an array of discrete plasmon supporting structures. A simple visible inspection of member/object 110 can indicate an amount of strain in the object from the color of the object 110. In a working environment, an inspector can simply look at object 110 and determine the level of strain in object 110. Light 210 may be any available lighting in the environment of object 110 or may or may not be a source of light with known spectral or polarization characteristics.

The principles or techniques illustrated in FIG. 2A can be employed to detect strain on any object 110. For example, object 110 may be a mechanical member or part, a container, a pipe, a valve, a tool, a panel, a plate, a casing, or a handle that may be coated with arrays of discrete plasmon supporting structures that change color when strain is present, for example, when object 110 may be close to a mechanical failure. Alternatively, the principles or techniques illustrated in FIG. 2A can be employed to effect a cosmetic change in object 110, e.g., when object 110 is a toy or decorative item, having a color that changes to a desired color in response to the application of a strain.

Figure 2B:
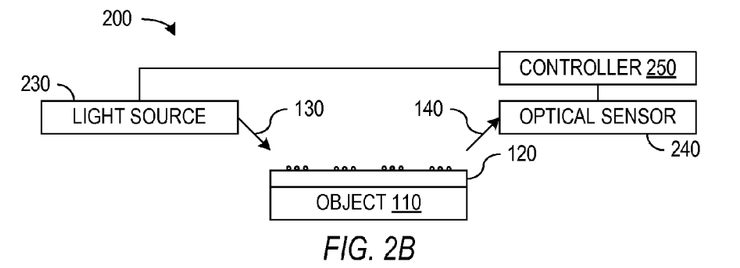

FIG. 2B illustrates a system 200 for obtaining a quantitative measurement of strain on an object 110 with an attached array 120 of discrete plasmon supporting structures. System 230 uses a lighting system 230 that produces input light 130 for illumination of array 120. Lighting system 230 may include any type of light source such as ambient light, an incandescent or fluorescent lighting fixture, a light emitting diode (LED), or a laser used with or without additional optical elements such as color or polarization filters. In one implementation, lighting system 230 has known spectral and polarization characteristics, which may be characteristic of the light source that lighting system 230 uses or characteristic of filters or other optical components that light source 230 applies to produce input light 130, and a controller 250 may operate lighting system 230 to alter input light 130 in a controlled manner. In one implementation described below, controller 250 may alter the operation of a light source or other optical components within lighting system 230 to change the polarization of input light 130.

An optical sensor 240 in system 200 measures output light 140 and may particularly measure the spectral content of output light 140 as a whole, within a specific or selectable angular range, or having a specific or selectable polarization. Optical sensor 240 may, for example, include a spectrometer, spectrophotometer, an image detector, or one or more photodiodes with or without polarization filters. (A photodiode used with color filters could act as a crude spectrometer, or if the wavelength shift is large enough a color filter may not be necessary). Polarization filters may be employed when selective measurement, e.g., spectral measurement, of one or more particular light polarizations is desired. As noted above, strain in object 110 can change the frequencies of plasmon resonances in array 120 and correspondingly change the optical response of array 120 and the optical characteristics of output light 140. Optical sensor 240, in general, can measure any optical characteristics of output light 140 that deformation of array 120 changes.

Controller 250 may include one or more processors capable of executing instructions or may be entirely a hardware controller. Controller 250 generally controls light source 230 and optical sensor 240 during measurement of output light 140 and can further analyze the measured characteristics of output light 140 and determine one or more measurements of a physical quantity such as the strain in object 110.

Figure 3A:
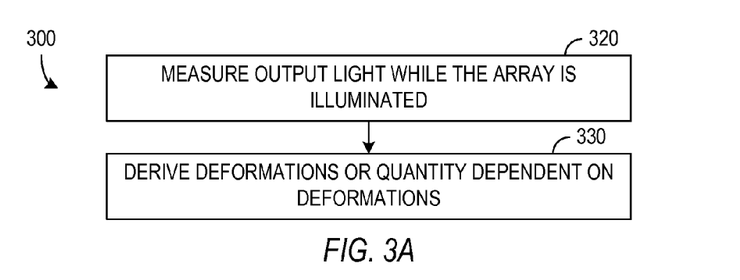
FIGS. 3A and 3B illustrate respective implementations of measurement processes using arrays of discrete plasmon supporting structures.

FIG. 3A illustrates one implementation of a measurement process 300 that can be performed with system 200. Process 300 basically includes measuring 320 of output light 140 during illumination of array 120 and based on the measured optical characteristics of output light 140, deriving or inferring 330 the strain or a physical quantity that depends on the strain.

In one specific implementation of system 200 and process 300, lighting system 230, optical sensor 240, and controller 250 of system 200 may be in a handheld measuring device, while object 110 is relatively immobile. For example, if object 110 is a large object such as components in a factory, building, or bridge, an inspector may employ the handheld device to illuminate a portion, e.g., a joint, of object 110 and measure light from the array 120 on object 110 as in step 320.

The measuring device can then process the optical measurements to produce a measurement result.

Figure 3B:
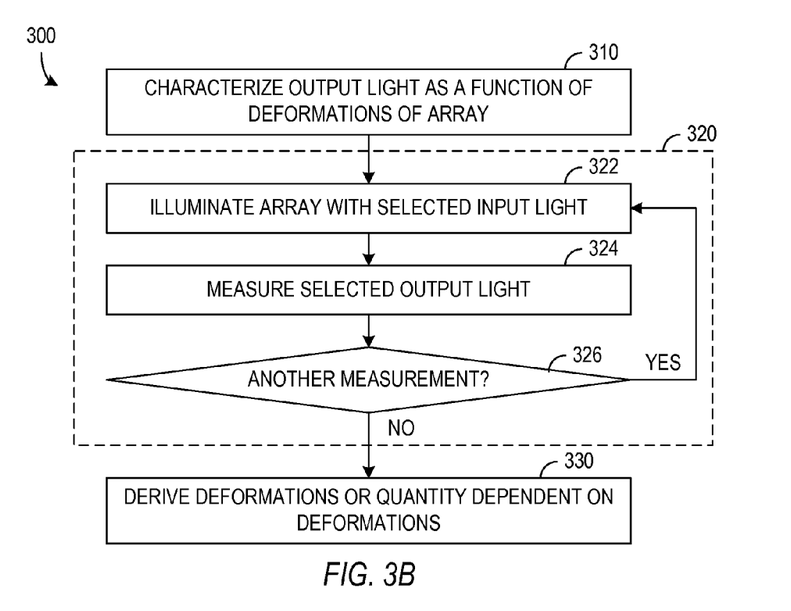

FIG. 3B shows a more specific implementation of measurement process 300, which further includes characterization 310 of the optical response of array 120 as a function of deformation in array 120. Characterization 310 may, for example, provide a mapping from a set of frequencies corresponding to peaks (maxima) or valleys (minima) in the spectral content of output light 140 to a combination of one or more components of deformation of object 110 or array 120 that would produce the measured frequencies. In a simple case, only one component of strain is of interest, e.g., stretching or compression along a linear direction or torsion about an axis, and characterization 310 may provide a simple function or lookup table that maps a frequency of a spectral peak to a value of the measurement result of interest. Characterization 310 of the output light from an array 120 may involve more complicated formulations that may require multiple functions or look-up tables for derivation of a measurement result from a spectral distribution. Characterization 310 of array 120 may possibly be derived from first principles based on the geometry and composition of array 120 or may be determined empirically from a calibration of array 120 or an archetype of array 120. Characterization 310 may be performed before or after fabrication of array 120.

The characteristics of output light 140 from array 120 may depend on the characteristics of input light 130. Characterization 310 may be for specific input light characteristics, and illumination may be controlled during optical measurement 330. In particular, variations in input lighting 130 can be used during optical measurement 320 to provide more information for derivation of a measurement result. Additionally, the characteristics of output light 140 may differ for different polarization components of output light 140, and optical measurement 320 may select and measure a particular polarization component. FIG. 3B illustrates an implementation of process 300 in which optical measurement 320 includes one or more illuminations 322 of array with input light 130 having different characteristics for each illumination 322 and with respective optical measurements 324 of output light 140.

Figure 4A:
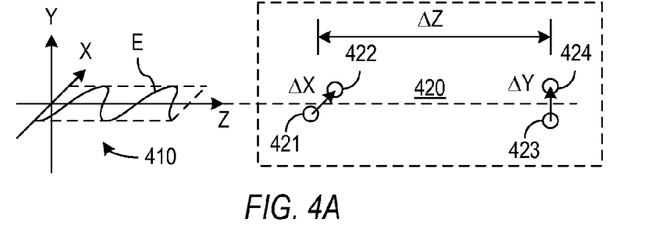
FIGS. 4A and 4B illustrate interactions of polarized light in an implementation of a strain measurement.

An even more specific implementation of optical measurement 320 uses different polarizations for input light 130. Light with different polarizations may interact differently with different plasmon resonant modes in array 120. FIG. 4A, for example, shows an example in which linearly polarized input light 410 interacts with an array 420 of plasmon supporting structures 421-424. In array 420, plasmon supporting structures 421 and 422 are separated by a distance ΔX along a horizontal or X direction, and plasmon supporting structures 423 and 424 are separated by a distance ΔY along a vertical or Y direction. In FIG. 4A, linearly polarized input light 410 has the electric field directed in an X direction and may interact most strongly with horizontal plasmon oscillations and therefore with a plasmon resonant mode associated with structures 421 and 422, collectively. Deformations of array 420 that change separation ΔX may thus significantly change the frequency of the plasmon resonant mode that input light 410 tends to excite. In contrast, plasmon resonant modes that structures 423 and 424 support may more weakly interact with horizontally polarized input light 410, or deformations of array 420 that change separation ΔX may not significantly change the frequency of the plasmon resonant modes that primarily reside in structures 423 and 424. In either case, horizontally polarized input light 410 may provide output light 140 that includes a strong peak associated with the resonances primarily associated with structures 421 and 422 or that changes most with deformations of array 420 in the X direction.

Figure 4B:
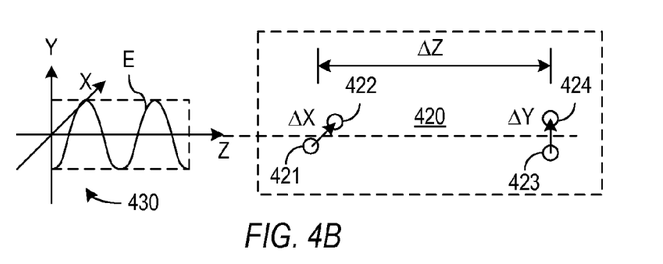

FIG. 4B shows the example of linearly polarized input light 430 having an electric field directed in the vertical or Y direction, so that input light 430 may interact most efficiently with a plasmon resonant mode associated with plasmon oscillations in the Y direction such as a plasmon resonance supported collectively in structures 423 and 424. Deformations of array 420 that change separation ΔY may thus significantly change the frequency of the plasmon resonant modes that input light 420 tends to excite, and vertically polarized input light 420 may provide output light that includes strong peaks associated with the plasmon resonances primarily associated with structures 423 and 424 or that change most with deformations of an array in the Y direction.

Light radiated or output from the resonance associated with plasmon oscillations in the X or Y direction may similarly have characteristic polarization. Accordingly, selectively filtering the polarization of the output light 140 may help to distinguish plasmon resonances associated with oscillations in the X and Y directions.

The polarization dependence of light-plasmon interactions can thus be used to measure specific components of deformation of an object or media containing an array of discrete plasmon supporting structures. Returning to FIG. 3B, optical measurement 320 can thus include: illumination 322 of array 120 with input light having selected and controlled characteristics, e.g., a selected linear polarization; optical measurement 324 of a selected component of output light 140, e.g., a selected linear polarization, while input light 130 has the selected characteristics; and repetition 326 of illumination 322 and measurement 324 until all desired illumination and measurement profiles have been exhausted, e.g., after illumination 322 and measurement 324 have been performed with all of the linear polarizations associated with symmetry axes in array 120. Optical measurement 320 may thus provide more data that derivation 330 can use to determine measurement results, e.g., to determine multiple components of the strain in object 110. Further, rapid alternation of the excitation light sources or rapid rotation or switching of polarization filters can lead to essentially continuous deformation measurement along multiple axes.

Figure 5A:
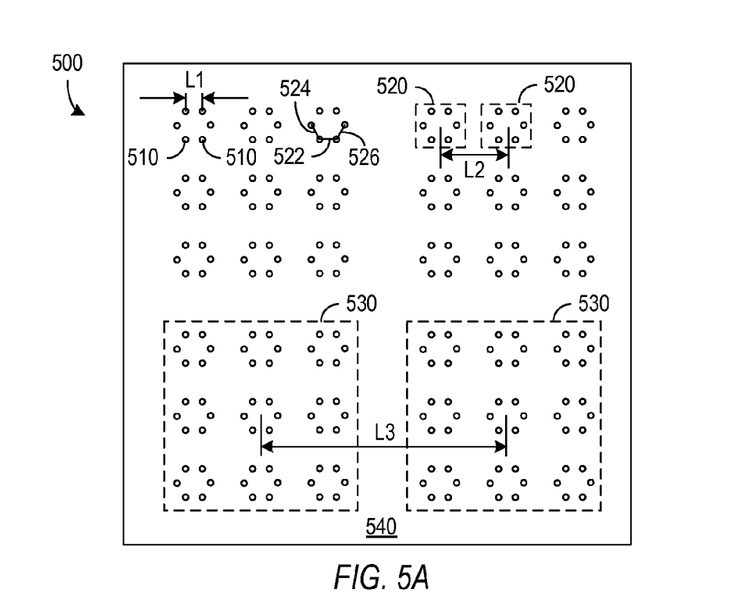
FIGS. 5A and 5B show hierarchical arrangements of plasmon supporting structures in respective implementations of strain gauges.

The specific configurations of arrays of discrete plasmon supporting structures can be varied widely according to the desired measurements and one implementation of a strain gauge uses a hierarchical array, which may provide a wide dynamic range of measurement results. FIG. 5A shows a plan view of one implementation of a strain gauge 500 including a hierarchical array of discrete plasmon supporting structures 510. Strain gauge 500 can be used to measure or indicate deformation of an object or any quantity that may be related to the deformation of the object. Gauges that measure quantities that are dependent on such deformations are sometimes referred to herein as strain gauges in the general sense that a strain gauge may measure strain, torsion, or any physical quantity that is related to the deformation of an object. Strain gauge 500 includes discrete structures 510 that are in or on a medium 540 and arranged to form assemblies 520 and 530 of different sizes. In the illustrated implementation, each assembly 530 is an array of smaller assemblies 520, and each assembly 520 is an array of discrete plasmon supporting structures 510. The implementation of FIG. 5A is thus one example of a three-level hierarchical arrangement of discrete plasmon supporting structures 510, but more generally, a strain gauge may have any number of hierarchical levels, including just a single level or arrangement of discrete plasmon supporting structures 510.

Each discrete plasmon supporting structure 510 is a structure in which plasmons may reside. The plasmons in structures 510 may interact to varying degrees across the separations between structures 510. The interaction of structures 510 depend upon the sizes, geometries, and material characteristics of structures 510 and the surrounding materials (in particular the dielectric properties of the materials between structures 510). The interaction as noted above can shift the frequencies of plasmon resonances or create additional, hybrid resonances. Plasmon supporting structures 510 are discrete in that, absent structures 510, the gaps or separating material between plasmon supporting structures 510 do not support strong plasmon resonances. For example, each plasmon supporting structure 510 may be a plasmonic nanoparticle surrounded by dielectric materials. However, plasmon supporting structures 510 may be connected to each other in some fashion to form arrays. For example, plasmon supporting structures 510 may be the tops of pillars or bumps that isolate or separate areas in which plasmons reside even though the pillars or bumps themselves are connected to each other through their bases.

In one implementation of strain gauge 500, medium 540 is a stretchable medium made of a material such as a suitable plastics, rubber, biopolymers, flexible metals, or fabric. Medium 540 may further be an insulator or dielectric material and may be transparent to frequencies of electromagnetic radiation corresponding to the frequencies of some plasmon resonances used in strain gauge 500 or may have a color, for example, black to absorb visible input light. Medium 540 may be selected to attach to or cover a surface of an object that undergoes a strain to be measured. For example, medium 540 may be a thin layer of material or tape with an adhesive that allows medium 540 to be attached to the object so that medium 540 is able to stretch, compress, or twist as the object undergoes the strain to be measured. Alternatively, medium 540 may itself be the object that undergoes the strain to be measured, or equivalently, medium 540 may be eliminated and discrete structures 510 may be directly attached to or deterministically positioned in or on an object for which strain is to be measured or identified.

Discrete plasmon supporting structures 510 collectively provide one or more useful plasmon resonances. In general, a plasmon is a quantum of plasma oscillation, and one type of plasma is made up of the free electrons near the surface of materials such as a metal. Plasmons at the surfaces of metals or at interfaces are commonly referred to as surface plasmons. A plasmon resonance of a structure corresponds to a frequency of plasmon oscillation at which the structure has a resonance for energy absorption or radiation. The plasmon resonances of discrete structures 510 generally depend on the material, size, and shape of discrete structures 510. Smaller structures, e.g., metal discs or spheres having diameters less than about 200 nm, tend to have fewer resonances and may have only one resonance in a desired frequency range, e.g., the frequencies corresponding to visible light, or have a few discrete resonances that are easily distinguishable. Particles having linear dimensions smaller than a few hundred nanometers, which may sometimes be referred to as nanoparticles, are one example of discrete structures that may collectively provide a suitable plasmon resonance. In particular, particles of a metal such as platinum, gold, silver, copper, aluminum, or nickel smaller than about 200 nm in width can be used to provide plasmon resonances with frequencies corresponding to the frequencies of visible light, but plasmon resonances may also be created at suitable semiconductor interfaces, e.g., a silicon-air interface. Discrete structures 510 thus may be separated semiconductor interfaces or any plasmon supporting structures with separations that can be determined during fabrication.

In the implementation of FIG. 5A, discrete structures 510 are arranged within assemblies 520 to have smallest interparticle gaps L1 aligned along a number of axes of interest, e.g., axes 522, 524, and 526. Assemblies 520 are arranged with smallest center-to-center separations L2 in a rectangular grid in a corresponding assembly 530, and assemblies 530 are arranged with smallest center-to-center separations L3 in a rectangular grid on medium 540. The plasmon resonances of discrete plasmon supporting structures such as metallic nanoparticles have been shown to be strongly dependent on interparticle spacing ranging from less than a few nanometers up to hundreds of nanometers. The implementation of strain gauge 500 of FIG. 5A can achieve a high dynamic range of the plasmon resonance variation by providing critical dimensions on a number of length scales. The different length scales in turn may correspond to different scales of resonance frequencies. In array 500, separations L1 between discrete structures 510 within a single assembly 520 are smallest, and separations L2 between adjacent assemblies 520 may be larger than separation L1. In general, each length scale will be most sensitive to changes on the order of that length scale, and the existence of larger assemblies on smaller scale resonances, e.g., higher frequency resonances, may primarily be changes in the width of the higher frequency resonances.

In one specific implementation, discrete structures 510 are about 5 to 200 nm in width, and separation L1 between closest neighboring structures 510 is about 1 to 50 nm. Separation L2 between assemblies 520 may be about 100 to 300 nm. As a result, strain gauge 500 may have plasmon resonance frequencies respectively corresponding to separations L1 and L2. When array 500 has a plasmon resonance that corresponds to a frequency of light, array 500 can become highly efficient at absorption or radiation of light having that frequency and therefore have a color that depends on the plasmon resonance. Changes in the plasmon resonances of strain gauge 500 that result from changes in separation L1 and L2 can be measured as described above by illuminating strain gauge 500 and observing the resulting output light.

Assemblies 530 in one implementation are separated by separations L3 that are larger than separations L1 or L2, and in one implementation of strain gauge 500, separation L3 may be on the order of the wavelength of light used for observation of strain gauge 500. As a result, in addition to variation of the plasmon resonance, the spacing of assemblies 530 may provide grating effects, and the grating effect may vary with deformation of medium 540. The grating effect may, for example, shift the direction of diffraction of specific wavelengths of light. Optical measurement of output light 140 may thus include measuring angular differences in output light 140, or wavelength of output light 140 at a given angle. Such grating effects may also be used to effectively focus or direct more of output light at a detector.

Figure 5B:
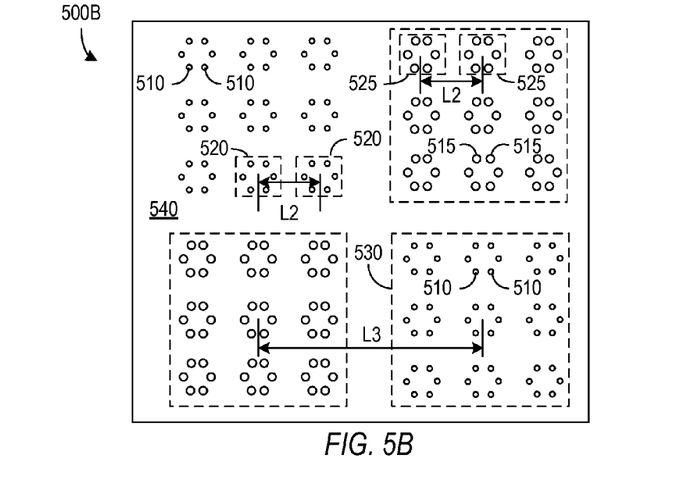

The plasmon resonances of individual structures 510 can interact over distances on the order of their size or greater, but typically the strongest interactions are over smaller length scales. In array 500, the smallest plasmon supporting structures 510 may be some sort of particle that is less than or on the order of a couple of hundred nanometers (e.g., down to about 5 or 10 nm). For strong interactions, smallest separations of structures 510 (at least when at their closest approach) may be less than the size of a single structure 510. The interactions between assemblies 520 at larger length scales would typically be weaker. Consequently, dynamic range may improve by having some assemblies contain plasmon supporting structures that are smaller and some other assemblies contain plasmon supporting structures that are larger. FIG. 5B, for example, shows an example of a hierarchical array 500B including assemblies 520 of discrete plasmon supporting structures 510 as described with reference to FIG. 5A and also assemblies 525 of discrete plasmon supporting structures 515. Plasmon supporting structures 515 may generally differ in size from plasmon supporting structures 510 and may be of the same or different composition. As a result, the plasmon resonances primarily in plasmon supporting structures 515 may expected to be different from the plasmon resonances primarily in plasmon supporting structures 510, whether or not structures 510 and 515 have the same or similar separations. The use of different size plasmon supporting structures 510 and 515 may provide array 500B with greater dynamic range in measurement of deformations of media 540.

Figures 6A, 6B, 6C:
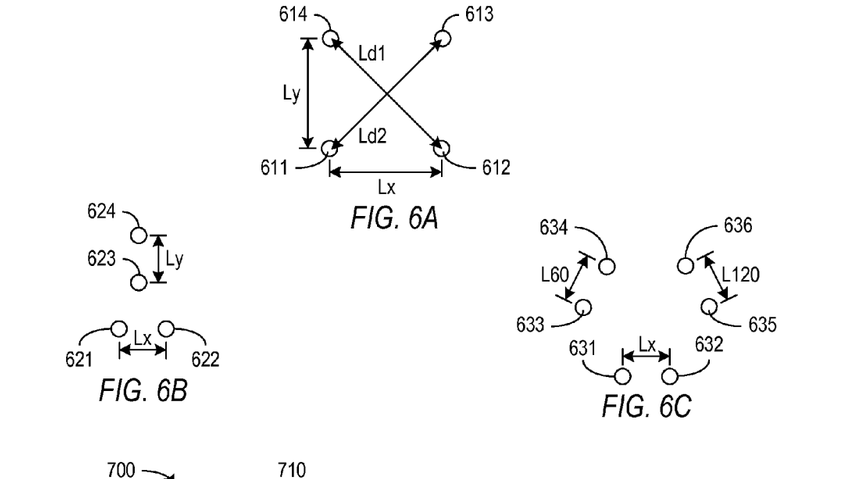
FIGS. 6A, 6B, and 6C respectively illustrate three different assemblies of plasmon supporting structures capable of indicating strain in at least two independent directions.

Strain gauges 500 and 500B of FIGS. 5A and 5B as described above provides examples of an arrangements of discrete structures 510 or 515 to provide a measurement or indication of the strain or deformation of an object. Many different types of arrangements are possible. FIGS. 6A, 6B, and 6C illustrate respective two-dimensional arrangements of discrete plasmon supporting structures 611-614, 621-624, and 631-634 within respective assemblies that provide sets of symmetry axes. In FIGS. 6A, 6B, and 6C, discrete structures 611-614, 621-624, and 631-634 may be but are not required to be substantially identical. For example, in FIG. 6A, discrete structures 611-614 may all be metal nanoparticles, separated regions of a suitable interface, or assemblies of such structures, and discrete structures 611-614 may all have the same size and composition. Alternatively, different types of plasmon supporting structures may be used within each assembly of FIG. 6A, 6B, or 6C.

FIG. 6A shows an assembly with a rectangular arrangement of plasmon supporting structures 611-614. Structures 611 and 612 are separated from each other by a separation Lx in an X direction as are structures 613 and 614. Similarly, structures 611 and 614 are separated from each other by a separation Ly in a Y direction as are structures 612 and 613. Separations Lx and Ly may be the same or be different from each other. If separations Lx and Ly are different, a plasmon resonance associated primarily with X-direction oscillations and separation of structures may have a different frequency from the frequency of a plasmon resonance associated primarily with Y-direction oscillations and separations of the structures. As described above, input and output light with a linear polarization in the X-direction may most effectively interact with plasmon resonances that oscillate along the X-direction and that are supported by structures 611 and 612 or 613 and 614 separated in the X direction. Similarly, input and output light with a linear polarization in the Y-direction may most effectively interact with plasmon resonances that oscillate along the Y-direction and are supported by structures 611 and 614 or 612 and 613 separated in the Y direction. Polarization filtering of input or output light may thus be used to separately measure deformation components.

FIG. 6B shows another example of a T-shaped arrangement of discrete plasmon supporting structures 621-624 that provide plasmon resonances corresponding to oscillation along orthogonal X and Y axes. With the T-shaped configuration, discrete structures 621 and 622 are separated along the X axis by a separation Lx, and discrete structures 623 and 624 are separated along the Y axes by a separation Ly. If desired, structures 621 and 622 may be different in size or composition or separation Lx may differ from Ly, so that a plasmon resonance associated primarily with structures 621 and 622 has a different frequency from the frequency of a plasmon resonance associated primarily with structures 623 and 624. Arrays or assemblies of plasmon supporting structures with the arrangement of FIG. 6B may thus provide information about two corresponding components of strain.

FIG. 6C shows an arrangement of six discrete plasmon supporting structures 631-636 that are arranged to provide separations Lx, L60, and L120 along three directions within the same plane. In particular, structures 631 and 632 are separated by a distance Lx along the X axis. Structures 633 and 634 are separated by a distance L60 along a direction 60° from the X axis. Structures 635 and 636 are separated by a distance L120 along a direction 120° from the X axis. Accordingly, three different polarizations of input light and/or separate measurements of output light having different polarizations can provide information for determining separate components of strain within the assembly of FIG. 6C.

Figure 7:
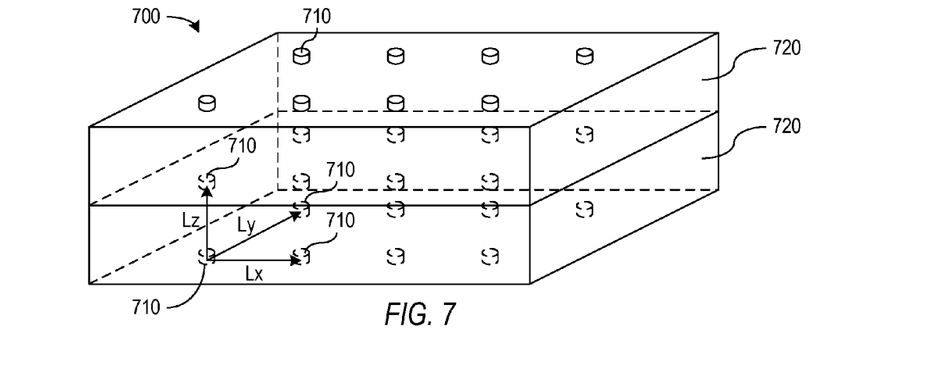
FIG. 7 illustrates an implementation of a strain gauge including a three-dimensional array of plasmon supporting structures.

FIGS. 6A, 6B, and 6C are examples of two-dimensional patterns of plasmon support structures for assemblies that may be used in two-dimensional arrays. However, three-dimensional arrays of discrete plasmon supporting structures could alternatively be employed and may be able to provide information about additional strain components. FIG. 7 shows an example of an array of discrete plasmon supporting structures 710 that are arranged at interfaces of multiple layers 720 in order to form a three-dimensional array. For example, plasmon supporting structures 710 can be plasmonic nanoparticles and may be arranged in multiple flat deterministic arrays such as described above, but in array 700, the flat deterministic arrays are stacked to create a three dimensional arrangement. In particular, separation Lx and Ly in X and Y directions may be between structures 710 in one layer of structures 710, and each layer may be separated by a separation Lz in a Z direction from an overlying or underlying layer of structures 710. The plasmon resonances of array 700 will generally depend on separations Lx, Ly, and Lz, so that deformation of array 700 in three different directions may have measurable effects on the plasmon resonances of array 700.

Figure 8A:
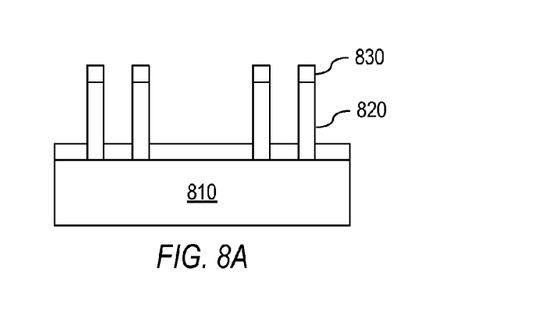
FIGS. 8A, 8B, 8C, and 8D illustrate a fabrication process for a strain gauge in accordance with one implementation.

FIGS. 8A, 8B, 8C, and 8D illustrate a process for fabrication of an array of discrete plasmon supporting structures. The illustrated fabrication process can begin as shown in FIG. 8A with fabrication of pillars 820 on a substrate 810 and deposition of metal caps 830 on the tops of pillars 820. In general, substrate 810 can be made of any desired material but in one implementation is a semiconductor substrate of a material such as silicon. Pillars 820 can be formed on substrate 810 using any fabrication techniques that are capable of producing pillars of the desired widths, which would typically be smaller than about 200 nm. For example, known integrated circuit fabrication techniques such as nanoimprint lithography can be used to achieve the desired feature size and a pattern for pillars 820 corresponding to the array of plasmon supporting structures to be created. Metal caps 830 can be made of any metal capable of supporting surface plasmons, e.g., platinum, gold, silver, copper, aluminum, or nickel caps, can be deposited on pillars using physical vapor deposition (PVD), chemical vapor deposition (CVD), electrochemical deposition, or sputtering, for example. As an alternative to deposition of metal on top surface of pillars 830, metal regions 830 may be formed from a layer of metal formed overlying a layer from which pillars 820 are formed and patterned at the same time pillars 820 are created.

Figure 8B:
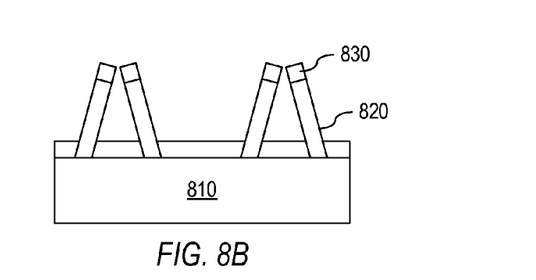

Pillars 820 may be closely spaced, e.g., less than 200 nm from a closest neighboring pillar 820 when originally formed, but the spacing between pillars 820 (and therefore between metal caps 830) can be further closed or reduced as shown in FIG. 8B. For example, when the pillars 820 are exposed to a volatile liquid which is allowed to evaporate, microcapillary forces between pillars 820 or metal caps 830 can pull metal caps toward their nearest neighbors and reduce their separation, e.g., down to less than about 1 nm. Molecules on the pillar surfaces can be used to maintain the gaps between the tips of pillars 820 in the range of 1-10 nm. These molecules can either be coated on pillars 820 before exposure to the volatile liquid, e.g. through vapor-phase self-assembly, or can be contained in the volatile liquid itself, coating the pillar surface before evaporation is completed.

Figure 8C:
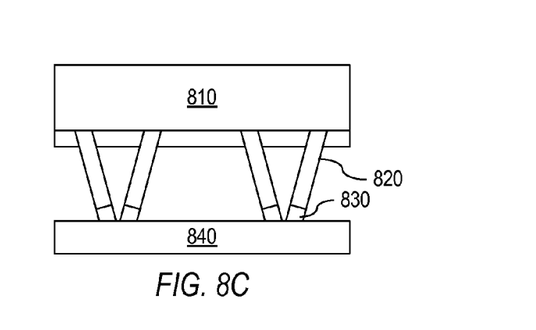
Figure 8D:
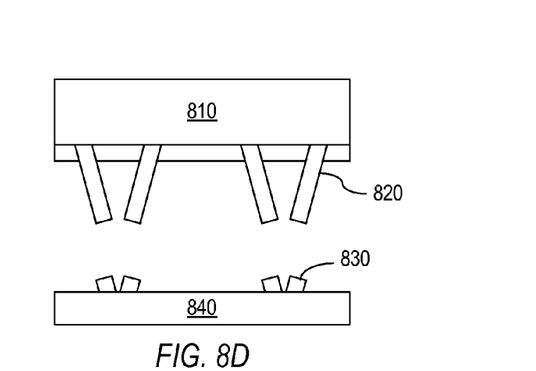

A nanoimprinting process illustrated in FIGS. 8C and 8D can be used to bond metal caps 830 with a new substrate 840. Substrate 840 is a flexible or deformable substantially flat substrate. Transfer of metal caps 830 to substrate 840 occurs after separating pillars 820 and substrate 810, provided that adhesion of caps 830 to substrate 840 is greater than the adhesion of caps 830 to pillars 820. This bonding can be achieved in a number of ways, such as through a chemical adhesive or through a curable polymer. Suitable adhesive layers include chemicals which bind strongly to substrate 840 while leaving one or more free groups to bond to metal caps 830. For example, mercaptopropyl-trimethoxy-silane (MPTMS) can be used to bind to oxide substrates, leaving a free thiol group to bind to gold, silver or other suitable metals. Suitable polymers include thermally curable materials such as polymethyl methacrylate (PMMA) and polymide and UV curable materials such as polydimethylsiloxane (PDMS). Substrate 840 with attached metal caps 830 can thus form a desired array for use in a strain sensor as described above or may be bonded to another layer on which further metal caps 830 are bonded, e.g., during fabrication of a three-dimensional array. In the case of transfer to a curable polymer, for example PDMS, a thick enough layer may be formed to peel off and apply to a new substrate if desired. Substrate 810 and pillars 820 can be discarded or reused as a template for fabrication of another array.

An article of Steven J. Barcelo, Ansoon Kim, Wei Wu, and Zhiyong Li, entitled "Fabrication of Deterministic Nanostructure Assemblies with Sub-nanometer Spacing Using a Nanoimprinting Transfer Technique," VOL. 6, NO. 7, 6446-6452, ACSNano (2012) further describes some suitable fabrication techniques and is hereby incorporated by reference in its entirety.

Figure 9:
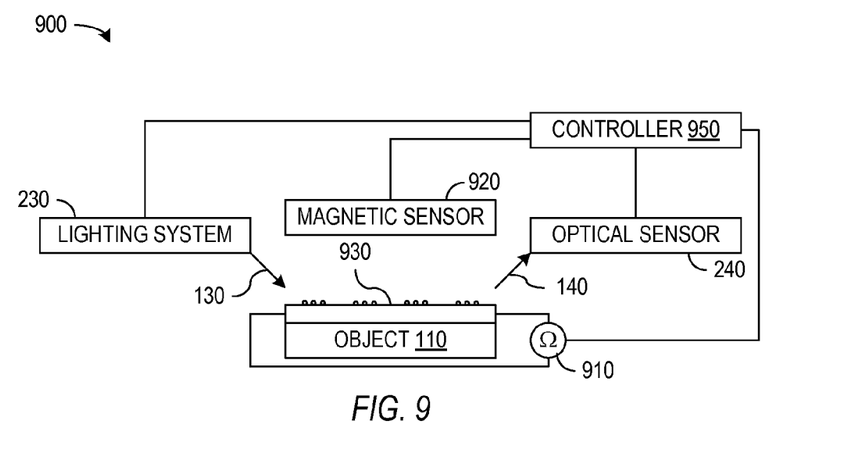
FIG. 9 is a block diagram of an implementation of a strain gauge that combines optical, electrical, and magnetic measurements when measuring strain.

The above described stress sensors that use optical measurements of light output from an array of discrete plasmon supporting structures can further employ additional techniques for measuring strain. In particular, when an array includes the plasmon supporting structures are metal or otherwise conductive, the electrical resistance of the array may also depend on deformation of the array and therefore may provide a secondary indication of the deformation of the object. Also, when an array includes the plasmon supporting structures that are ferromagnetic, the magnetic properties of the array may depend on deformation of the array and therefore may provide a different or a further secondary indication of the deformation of the object. FIG. 9 is a block diagram of a strain sensor 900 that employs an array 930 of discrete plasmon supporting structure for measurement of strain in an object 110 or within array 930. Array 930 may be substantially identical to array 130 described above, but for the particular implementation of FIG. 9, array 930 uses ferromagnetic conductive particles, e.g., nickel nanoparticles, as the discrete plasmon supporting structures. Array 930 may further include additional structures such electrical contacts for measurement of resistance in array 930.

Strain sensor 900 may employ lighting system 230 and an optical sensor 240 in the same manner described above to measure output light 140 and determine the optical response of array 930 to input light 130. However, sensor 900 further includes an ohm meter or other resistance measuring device 910 that measures the electrical resistance across array 930. In general, the electrical resistance may be expected to increase as the separations between conductive structures in array increase. Sensor 920 also includes a magnetic sensor 920 that detects the magnetic properties of array 930. The magnetic sensor 920 could scan the surface to measure the magnetic field in a given area. In general, the magnetic field in a given area may be expected to decrease as the material is stretched, decreasing the effective density of magnetic nanoparticles. Controller 950 in addition to performing the functions of controller 250 described above can combine strain measurements based on optical, resistive, and magnetic characteristics of array 930 to improve accuracy of measurements of strain or another physical quantity that depends on the strain in array 930.

Although particular implementations have been disclosed, these implementations are only examples and should not be taken as limitations. Various adaptations and combinations of features of the implementations disclosed are within the scope of the following claims.

What is claimed is:

1. A strain gauge comprising:
   a medium that is deformable; and
   a plurality of discrete plasmon supporting structures arranged with the medium to create one or more plasmon resonances that change with deformation of the medium so that a color of light scattered from the strain gauge visibly changes with the deformation of the medium.

2. The strain gauge of claim 1, wherein the medium is a surface of or is attached to a surface of an object that is subject to strain to be observed.

3. The strain gauge of claim 1, wherein the discrete plasmon supporting structures include:
   a plurality of discrete plasmon supporting structures that have a first size; and
   a plurality of discrete plasmon supporting structures that have a second size that is larger than the first size.

4. The strain gauge of claim 1, wherein the plasmon supporting structures comprise a conductive material and provide the strain gauge with a measurable electrical resistance that depends on deformation of the medium.

5. The strain gauge of claim 1, wherein the discrete plasmon supporting structures are arranged in a hierarchical array that provides multiple spacing length scales including a spacing length scale less than 50 nm.

6. A strain gauge comprising:
   a medium that is deformable; and
   a plurality of discrete plasmon supporting structures arranged with the medium to create one or more plasmon resonances that change with deformation of the medium and provide the strain gauge with an optical characteristic that depends on the deformation of the medium, wherein the discrete plasmon supporting structures are arranged to form a hierarchical structure that includes:
   a plurality of first assemblies of the discrete plasmon supporting structures, wherein the plasmon supporting structures have first separations within the first assemblies; and one or more second assemblies containing the first assemblies, wherein the first assemblies have second separations within the one or more second assemblies.

7. The strain gauge of claim 6, wherein:
a first of the one or more plasmon resonance that has a first optical characteristic that depends on the first separations; and
a second of the one or more plasmon resonances has a second optical characteristic that depends on the second separations.

8. The strain gauge of claim 6, wherein the one or more second assemblies comprises a plurality of the second assemblies arranged in an array with third separations, wherein:
the first separations are less than about 50 nm;
the second separations are more than 100 nm; and
the third separations are larger than the second separations and cause a diffraction pattern that depends on deformation of the medium.

9. The strain gauge of claim 7, wherein each of the first optical characteristic and the second optical characteristic is selected from a group consisting of a frequency, an amplitude, and a width of a feature that the one or more plasmon resonances create in a spectral distribution of light scattered from the strain gauge.

10. The strain gauge of claim 6, further comprising a lighting system that is controllable to switch between illuminating the discrete plasmon supporting structures with light having a first polarization corresponding to a first symmetry axis of an arrangement of the discrete plasmon supporting structures and illuminating the discrete plasmon supporting structures with light having a second polarization corresponding to a second symmetry axis of the arrangement of the discrete plasmon supporting structures.

11. The strain gauge of claim 6, further comprising:
an optical sensor; and
a controller coupled to the optical sensor and configured to derive a measurement result from measurements that the optical sensor provides of output light from the discrete plasmon supporting structures.

12. The strain gauge of claim 11, wherein the optical sensor is operable to separately measure light having first and second polarizations, wherein the first polarization corresponds to a first symmetry axis of an arrangement of the discrete plasmon supporting structures and the second polarization corresponds to a second symmetry axis of the arrangement of the discrete plasmon supporting structures.

13. A strain gauge comprising:
a medium that is deformable; and
a plurality of discrete plasmon supporting structures arranged with the medium to create one or more plasmon resonances that change with deformation of the medium and provide the strain gauge with an optical characteristic that depends on the deformation of the medium, wherein the plasmon supporting structures comprise a ferromagnetic material and provide the strain gauge with a measurable magnetic characteristic that depends on deformation of the medium.

14. The strain gauge of claim 13, further comprising:
an optical sensor;
a magnetic sensor; and
a controller to derive a measurement result using a measurement of the optical characteristic from the optical sensor and a measurement of the magnetic characteristic from the magnetic sensor.

15. A measuring method comprising:
providing a plurality of discrete plasmon supporting structures on an object and arranged to create a plasmon resonance that depends on deformation of the object; and
observing, with a naked eye, a change in an optical characteristic of the object to detect a deformation of the object, wherein the optical characteristic observed is caused by the plasmon resonance.

16. The method of claim 15, wherein observing the change in the optical characteristic comprises visually observing a change in color of light scattered from the object.

17. A measuring method comprising:
providing a plurality of discrete plasmon supporting structures on an object and arranged to create a plasmon resonance that depends on deformation of the object;
observing a change in optical characteristics of the object to detect a deformation of the object, wherein the optical characteristic observed is caused by the plasmon resonance;
measuring a secondary characteristic that the discrete plasmon supporting structures provide across an area of the object, wherein the secondary characteristic is one of an electrical resistance and a magnetic characteristic; and
using the secondary characteristic measured in determination of the deformation of the object.

18. The method of claim 17, wherein observing the change comprises measuring and analyzing a spectral content of light reflected from the plasmon supporting structures.

* * * * *